United States Patent
Verma et al.

(10) Patent No.: US 11,855,844 B2
(45) Date of Patent: Dec. 26, 2023

(54) CLOUD SERVICE COMPONENT DEPENDENCIES

(71) Applicant: MICROSOFT TECHNOLOGY LICENSING, LLC, Redmond, WA (US)

(72) Inventors: Nidhi Verma, Redmond, WA (US); Roberta Cannerozzi, Bellevue, WA (US); Erik Wahlstrom, Sammamish, WA (US); Le Chang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 67 days.

(21) Appl. No.: 17/332,701

(22) Filed: May 27, 2021

(65) Prior Publication Data
US 2022/0385535 A1 Dec. 1, 2022

(51) Int. Cl.
*G06F 8/71* (2018.01)
*G06F 8/61* (2018.01)
(Continued)

(52) U.S. Cl.
CPC ............ *H04L 41/0886* (2013.01); *G06F 8/61* (2013.01); *G06F 8/71* (2013.01); *H04L 41/0806* (2013.01); *H04L 41/5045* (2013.01)

(58) Field of Classification Search
None
See application file for complete search history.

(56) References Cited

U.S. PATENT DOCUMENTS

| 9,118,677 B2 | 8/2015 | Xu et al. |
| 9,170,798 B2 | 10/2015 | Nagaraja et al. |

(Continued)

FOREIGN PATENT DOCUMENTS

| CN | 108762769 A | 11/2018 |
| CN | 112000365 A | 11/2020 |

OTHER PUBLICATIONS

"Zero-Touch Deployment", Retrieved from: https://web.archive.org/web/20210117191952/https:/www.incontinuum.com/solutions/zero-touch-deployment-cloud/, Jan. 17, 2021, 4 Pages.

(Continued)

*Primary Examiner* — Derrick W Ferris
*Assistant Examiner* — Keith Follansbee
(74) *Attorney, Agent, or Firm* — Newport IP, LLC; Jacob P. Rohwer

(57) ABSTRACT

Technologies are disclosed for improving the deployment of a cloud-hosted service. Before being deployed to a particular environment, a cloud-hosted service must be configured for that environment. Configuring a deployment includes determining which components to deploy, determining how to connect with external components, identifying onboarding procedures, etc. A dependency data model defines a hierarchy of components utilized by the cloud-hosted service. For each component in the hierarchy, configuration parameters define how to deploy that component. A list of configuration parameters that do not yet have values for a target environment may be generated and provided to a user. Values for these parameters may then be received. A configuration for the target environment is then generated based on the dependency data model and the received values. The dependency data model may inherit dependencies and configuration properties from ancestors in a hierarchy of dependency data models.

20 Claims, 12 Drawing Sheets

(51) Int. Cl.
*H04L 41/08* (2022.01)
*H04L 41/0806* (2022.01)
*H04L 41/5041* (2022.01)

(56) References Cited

U.S. PATENT DOCUMENTS

| | | | |
|---|---|---|---|
| 9,547,478 B1 * | 1/2017 | Hale | G06F 8/433 |
| 9,684,502 B2 | 6/2017 | Fu et al. | |
| 10,432,471 B2 | 10/2019 | Gershaft et al. | |
| 10,601,956 B2 | 3/2020 | Nucci et al. | |
| 10,725,752 B1 * | 7/2020 | Wagner | G06F 16/183 |
| 11,044,139 B1 * | 6/2021 | Farber | H04L 41/0266 |
| 2013/0232463 A1 * | 9/2013 | Nagaraja | G06F 3/0482 |
| | | | 717/101 |
| 2016/0294614 A1 * | 10/2016 | Searle | H04L 67/34 |
| 2016/0335066 A1 | 11/2016 | Zhang et al. | |
| 2019/0171966 A1 | 6/2019 | Rangasamy | |
| 2019/0341039 A1 * | 11/2019 | Bharadwaj | G06F 40/30 |
| 2020/0004528 A1 * | 1/2020 | Pape | G06F 8/65 |
| 2021/0124576 A1 * | 4/2021 | Gungabeesoon | G06F 8/38 |

OTHER PUBLICATIONS

Bhattacharjee, et al., "CloudCAMP: Automating Cloud Services Deployment & Management", In Repository of arXiv:1904.02184v2, Apr. 9, 2019, 12 Pages.

"International Search Report & Written Opinion issued in PCT Application No. PCT/US22/027184", dated Jul. 21, 2022, 14 Pages.

* cited by examiner

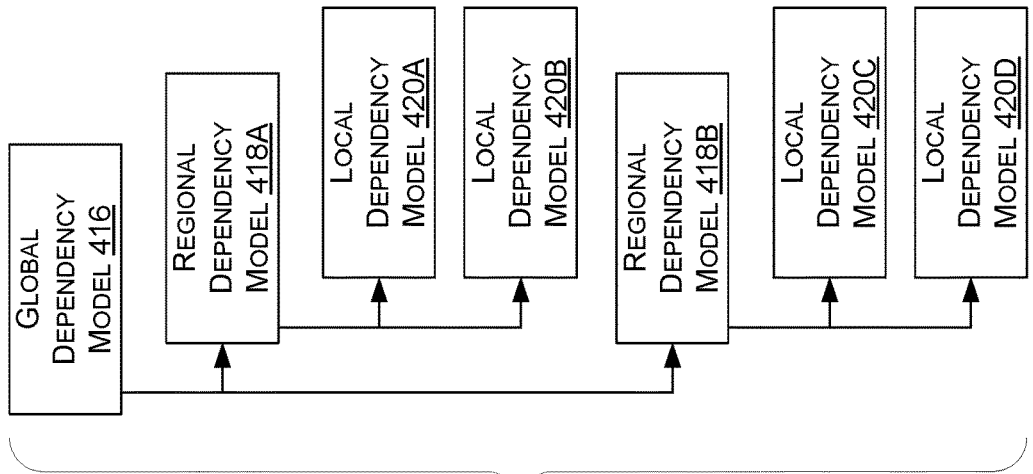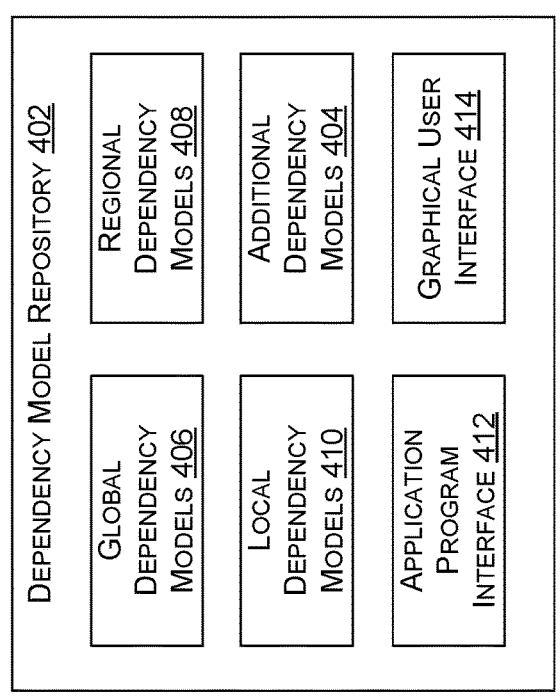
FIG. 4A

APPLICATION PROGRAM INTERFACE 412

RETRIEVE DEPLOYMENT PROPERTIES 422

RetrieveDeploymentProperties(DependencyModelName 424, ParentModelNames 426) -> ListOfProperties 428;

CREATE DEPENDENCY PROPERTY 430

CreateDependencyProperty(DependencyModelName 424, PropertyName 432, Types 434);

SET DEPENDENCY PROPERTY VALUE 436

SetDependencyProperty(DependencyModelName 424, PropertyName 432, PropertyValue 438);

CREATE DEPENDENCY MODEL 440

CreateDependencyModel(DependencyModelName 424, ParentModelNames 426);

DELETE DEPENDENCY MODEL 444

DeleteDependencyModel(DependencyModelName 424);

RECEIVE DEPLOYMENT PROPERTY VALUES 448

ReceiveDeploymentPropertyValues(DependencyModelName 424, PropertyValues 449);

FIG. 4B

```
GLOBAL DEPENDENCY MODEL 416

"ROOT" : {                                                      450
    "COMPONENTTYPE": "CORESERVICE",                             451
    "PROPERTY" : {                                              452
        "NAME": "SERVICE NAME",                                 453
        "DATATYPE": "STRING",                                   454
        "VALUE": "DEPLOYMENT EXAMPLE",                          455
    },
    "PROPERTY" : {                                              456
        "NAME": "DNS SUFFIX",                                   457
        "DATATYPE": "REGEX",                                    458
        "PATTERN": "(\w+[\w\d]*\.)+\.COM",                      459
        "VALUE": "",                                            460
    },
    "EXTERNALDEPENDENCY": {                                     461
        "NAME": "SQL AZURE",                                    462
        "DATATYPE": "IP",                                       463
        "RUNTIMETYPE": "ENDPOINT",                              464
        "VALUE": "254.132.43.1",                                465
    },
    "MICROSERVICEDEPENDENCY": {                                 466
        "NAME": "AUDIO SERVICE",                                467
        "VALUE": "AUDIOSERV",                                   469
    },
    "ONBOARDINGDEPENDENCY": {                                   470
        "NAME": "DIRECTORY SERVICE",                            471
        "PROMPT": "INITIATE ONBOARDING PROCEDURE 124"           473
    },
    "INBOUNDDEPENDENCY" : {                                     474
        "NAME": "GRAPH API",                                    475
        "DATATYPE": "URL",                                      476
        "RUNTIMETYPE": "GRAPHAPI",                              477
        "VALUE": "GRAPH365.AZURE.COM",                          478
    },
},

"AUDIOSERV" : {                                                 479
    "COMPONENTTYPE": "MICROSERVICE",
    "MICROSERVICEDEPENDENCY": {                                 480
        "NAME": "STORAGE SERVICE",
        "VALUE": "STORAGESERV"
    },
}
```

FIG. 4C

```
REGIONAL DEPENDENCY MODEL 418A

"ROOT": {                                                           481
    "EXTERNALDEPENDENCY": {                                         482
        "NAME": "DNSSERVICE",                                       483
        "DATATYPE": "URL",
        "VALUE": "DNS.NORTHAMERICA.AZURE.COM"                       485
}
```

```
LOCAL DEPENDENCY MODEL 420A

"ROOT": {                                                           486
    "SECURITYLEVEL": "AIRGAP",                                      487
    "PROPERTY" : {                                                  488
        "NAME": "ADMIN EMAIL",
        "DATATYPE": "STRING",
        "VALUE": ""
    },
    "AIRGAPPROPERTY": {                                             489
        "NAME": "ALLOWED IP ADDRESSES",                             490
        "DATATYPE": "IPRANGE",                                      491
        "VALUE": "RETRIEVE ALLOWED IP ADDRESSES FROM XXX"           492
    },
    "PROPERTY": {                                                   493
        "NAME": "TELEMETRY SINK",
        "DATATYPE": "STRING",
        "VALUE": "REDMONDTELEMETRY.COM"
    },
},

"STORAGESERV" : {                                                   494
    "COMPONENTTYPE": "MICROSERVICE",
    "EXTERNALDEPENDENCY": {                                         495
        "NAME": "STORAGE SERVICE",
        "DATATYPE": "IP",
        "RUNTIMETYPE": "ENDPOINT",
        "VALUE": ""
    },
}
```

FIG. 4D

```
                    RETRIEVED DEPLOYMENT PROPERTIES 602

"ROOT" : {                                                              651
    "PROPERTY" : {                                                      652
        "NAME": "SERVICE NAME",                                         653
        "VALUE": "",                                                    655
    },
    "PROPERTY" : {                                                      656
        "NAME": "DNS SUFFIX",
        "VALUE": "",
    },
    "ONBOARDINGDEPENDENCY": {                                           670
        "NAME": "DIRECTORY SERVICE",
        "PROMPT": "INITIATE ONBOARDING PROCEDURE 124"                   673
    },
    "PROPERTY" : {                                                      687
        "NAME": "ADMIN EMAIL",
        "VALUE": ""
    },
    "AIRGAPPROPERTY": {                                                 689
        "NAME": "ALLOWED IP ADDRESSES",
        "VALUE": "RETRIEVE ALLOWED IP ADDRESSES FROM XXX"692
    },

"STORAGESERV" : {                                                       694
    "EXTERNALDEPENDENCY": {                                             695
        "NAME": "STORAGE SERVICE",
        "VALUE": ""
    },
}
```

```
                  PROPERTY VALUES TO BE SUBMITTED 702

"ROOT" : {
     "PROPERTY" : {                                              752
          "NAME": "SERVICE NAME",
          "VALUE": "SHAREPOINT",                                 755
     },
     "PROPERTY" : {                                              756
          "NAME": "DNS SUFFIX",
          "VALUE": "CONTOSO.SHAREPOINT.COM",                     760
     },
     "ONBOARDINGDEPENDENCY": {
          "NAME": "DIRECTORY SERVICE",
          "PROMPT": "INITIATE ONBOARDING PROCEDURE 124"
     },
     "PROPERTY" : {                                              788
          "NAME": "ADMIN EMAIL",
          "VALUE": "ADMIN@CONTOSO.COM"                           796
     },
     "AIRGAPPROPERTY": {                                         789
          "NAME": "ALLOWED IP ADDRESSES",
          "VALUE": "256.43.23.54 - 256.43.23.64"                 792
     },

"STORAGESERV" : {                                                794
     "EXTERNALDEPENDENCY": {                                     795
          "NAME": "STORAGE SERVICE",
          "VALUE": "STORAGE.CONTOSO.AZURE.COM"
     },
}
```

FIG. 7

CLOUD SERVICE COMPONENT DEPENDENCIES

BACKGROUND

As software complexity increases, so too does the complexity of deploying that software. When deploying an application, dependencies must be installed and settings must be configured, among other tasks. Failing to install a dependency or mis-configuring a setting may cause the application to lose data, crash sporadically, or fail to operate altogether.

Some hosted software applications, e.g. cloud-hosted services, have attempted to reduce application complexity and improve application scalability by moving from a monolithic application architecture to a "microservices" architecture. Microservices are loosely coupled services that each implement a particular task. By packaging functionality in microservices, application features may be released or updated without re-deploying the entire application. However, this flexibility comes with a cost—increased deployment complexity. Each microservice has to be configured for a particular deployment, and each microservice has its own set of dependencies. These configuration properties and dependencies are often tracked in spreadsheets, comments within source code, or in the minds of people tasked with deploying the application. These ad-hoc techniques for configuring and deploying a software application bear significant costs in terms of application availability and reliability, as well as the human and financial cost of maintaining such a system.

It is with respect to these and other technical challenges that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

Technologies are disclosed for improving the deployment of a cloud-hosted service. Before being deployed to a particular environment, a cloud-hosted service must be configured for that environment. Configuring a deployment includes determining which components to deploy, determining how to connect with external components, identifying onboarding procedures, etc. A dependency data model defines a hierarchy of components utilized by the cloud-hosted service. For each component in the hierarchy, configuration parameters define how to deploy that component. A list of configuration parameters that do not yet have values for a target environment may be generated and provided to a user. Values for these parameters may then be received. A configuration for the target environment is then generated based on the dependency data model and the received values. The dependency data model may inherit dependencies and configuration properties from ancestors in a hierarchy of dependency data models.

Maintaining configuration data in a hierarchy of dependency data models enables agile deployment of a cloud-hosted service into different markets among different regions. In some embodiments, dependency data models at different levels of the hierarchy are associated with different geographic regions. A root dependency data model may contain global component dependencies and their configurations, while leaf dependency data models may contain component dependencies and their configurations specific to a particular deployment. Intermediate data dependency models may contain component dependencies and configurations for specific geographic regions.

These technologies are particularly useful to the deployment of cloud-hosted services implemented with a microservices architecture. While providing many advantages, a microservices architecture significantly increases the complexity of deploying a cloud-hosted service. The disclosed embodiments enable each microservice to be individually configured, and dependencies of each microservice to be individually managed.

In some embodiments, in preparation for deploying the cloud-hosted service to a new environment, or in order to update an existing deployment, the dependency data model repository provides a list of configuration properties without corresponding values. The list of properties without corresponding values is specific to the target environment. For example, an IP address of a database service may be required to configure a deployment. As another example, a recently added feature may depend on the availability of a specific microservice.

The list of configuration properties without corresponding values may be generated in response to a request received from a user tasked with performing the deployment, or by software that automates the task of deployment. The request may include an identifier of a dependency model that is specific to the target environment, or a list of attributes of the target environment.

Each dependency data model may include a list of components, e.g. microservices, of the cloud-hosted service. The list of components may include dependency information, including dependencies on other components on the list, external dependencies to an application that is deployed independent of the service, onboarding dependencies, and inbound dependencies. Each of these types of dependencies are discussed in more detail below. In some embodiments, the dependencies of the service being deployed are traversed, and configuration properties not currently associated with a value are identified and provided in response to the request.

If the target environment is represented by a dependency data model that is part of a hierarchy of dependency data models, component dependencies from ancestor dependency data models are also traversed. In some embodiments, when multiple dependency data models in the hierarchy refer to the same component, values from a descendant model may replace those from an ancestor model. In other embodiments, security restriction may prevent the value of a configuration property from being stored in the dependency data model repository.

In some embodiments, values associated with the provided list of configuration properties are received from a user performing the deployment. The deployment to the target environment may then be configured based on the received values and values retrieved from the dependency data model and any ancestor dependency data models. In some embodiments, the dependency data model may be updated to include some of the received values. An automated deployment system may optionally perform the deployment based on this configuration.

In some embodiments, a configuration property of a component listed in the dependency data model prompts a user to perform a task instead of soliciting a value. For example, instead of soliciting a Universal Resource Locator (URL) of an endpoint of a microservice, a configuration property may include text the instructs the user to initiate an onboarding procedure with an external service. The configuration property may optionally indicate a runtime type check to determine, at the time of deployment, whether the task was actually performed.

In some embodiments, a component of the dependency data model describes an inbound dependency. An inbound dependency defines a relationship in which an external service consumes the cloud-hosted service being deployed. For example, a service that tracks deployments may have a dependency on the cloud-hosted service being deployed.

In some embodiments, a configuration property is associated with a data type check that verifies that a received value is of the appropriate data type. For example, a data type check may verify that an email address is well-formed, or that an IP address is within an allowed range. A data type check may be performed when the value is received, or any time thereafter. A configuration property may also be associated with a runtime type check that performs a validation step at the time of deployment. For example, a configuration property for a microservice endpoint may verify at the time of deployment that the microservice is running and accessible to the cloud-hosted service being deployed.

In some embodiments, the list of configuration properties is provided as a text file, e.g. formatted as eXtensible Markup Language (XML), JavaScript Object Notation (JSON), plain text, or the like. In other embodiments, the list of configuration properties is returned as a relational database table. In still other embodiments, the list of configuration properties is provided via a graphical user interface (GUI) that the user interacts with to set values.

In some embodiments, the dependency data model is updated dynamically when features are added or removed from the cloud-hosted service. In some embodiments, an engineer that submits the new feature for inclusion in the cloud-hosted service may also submit a change to the dependency data model that specifies any new, updated, or deleted components, and any changes to the configuration properties of an existing component.

A new feature may be implemented in a new microservice. If the new feature applies worldwide, the new microservice may be listed in a root dependency data model of a hierarchy of dependency data models. If the new feature is specific to a particular geographic region, the new microservice may be listed in an intermediate dependency data model of the hierarchy of dependency data models. If the new feature is specific to a particular deployment, the new microservice may be listed in the dependency data model specific to that deployment.

The new microservice may itself introduce new dependencies. These dependencies may be indicated by configuration properties of the component listed in a dependency data model. For example, the new microservice may depend on an external service, and so the component representing the new microservice may include a configuration property referencing an endpoint of the external service. If the new microservice depends on a second new microservice, the second new microservice may also be added as a component to the dependency data model.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is a block diagram illustrating a dependency model repository and a hierarchy of dependency models.

FIG. 4B is a block diagram illustrating an application program interface (API) used to manage the dependency model repository.

FIG. 4C illustrates an exemplary global dependency model.

FIG. 4D illustrates exemplary regional and local dependency models.

FIG. 6 illustrates an example of properties without values retrieved from a dependency model.

FIG. 7 is an illustration of corresponding values submitted to the dependency model repository.

DETAILED DESCRIPTION

The technologies disclosed herein provide for technical improvements in the deployment of software applications. As described briefly above, the complexity of deploying and updating a cloud-hosted service is significant. Tens if not hundreds of engineers may be independently deploying new features, bug fixes, and other changes. Doing as such may entail introducing a new microservice, updating a dependency of a microservice already in use, or updating other configuration information. Ad-hoc maintenance of configuration and dependency information causes deployment to be costly and time-consuming. This problem is particular to the domain of software engineering and managing the deployment of software, such as deploying a cloud-hosted service implemented with a microservices architectures.

To address this technological challenge, and potentially others, configuration and dependency information is centralized in a dependency data model repository. A hierarchy of dependency data models is stored in the repository, enabling common configuration and dependency information to be centralized and re-used while allowing different components to quickly be configured for deployment to different environments. The disclosed techniques also have the technical effect of enabling software deployment to be automated, in whole or in part. The disclosed technologies may also provide technical benefits other than those described herein. Additional details regarding these aspects and others will be provided below with regard to the several FIGS.

Figure 1:
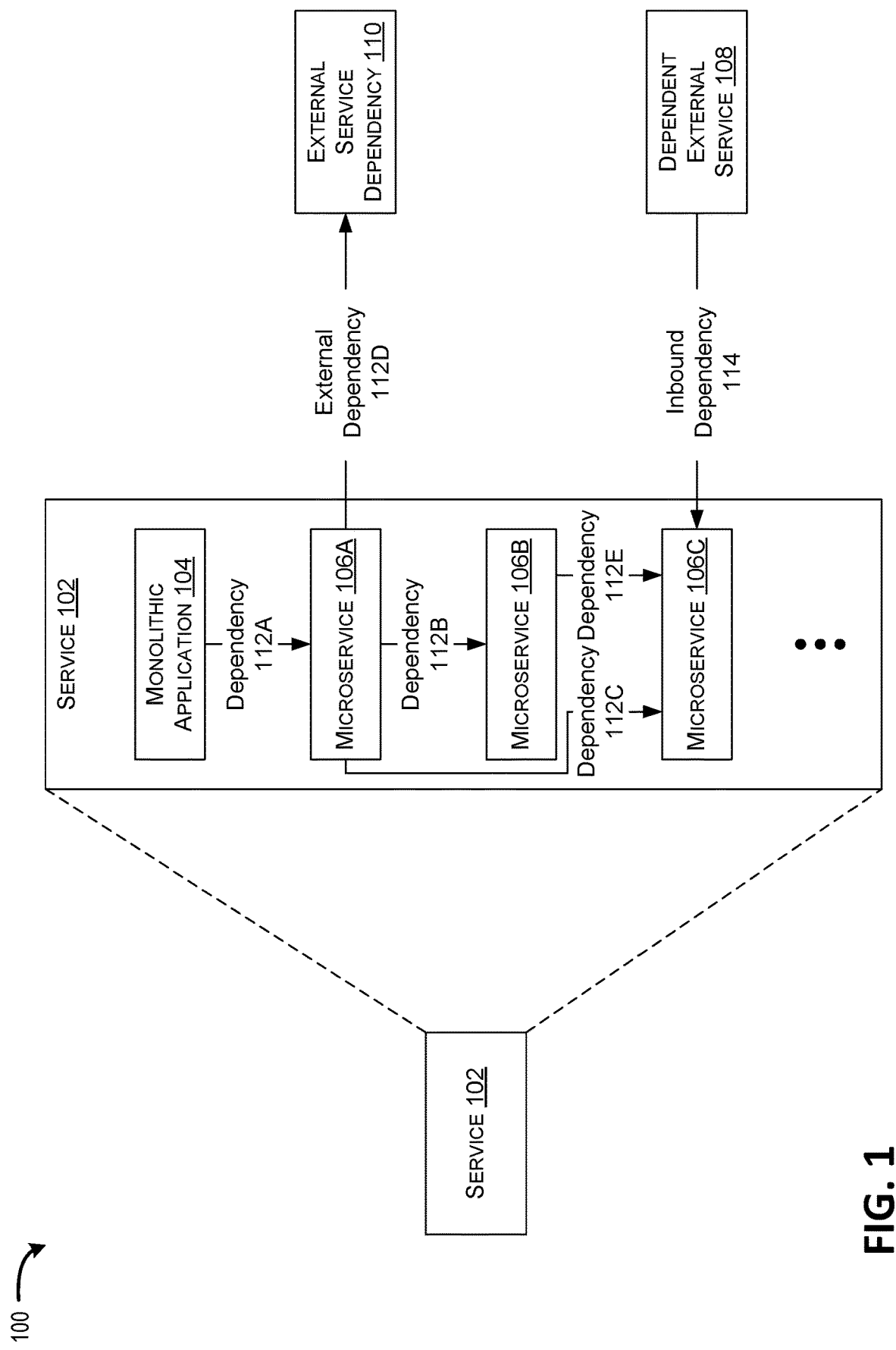
FIG. 1 is a block diagram illustrating dependencies among components of a hosted service.

FIG. 1 is a block diagram 100 illustrating dependencies among components of a service 102. Service 102 may be hosted in a cloud environment, such as Microsoft Azure®. However, service 102 may also be hosted by a traditional server or datacenter. As illustrated, service 102 includes monolithic application 104 and microservices 106. As discussed above, a monolithic application provides multiple features, and may often constitute the "main" application. Typically, a monolithic application executes within a single execution environment, such as a single process, a single server, or other unit of computation.

As referred to herein, a microservice is a self-contained piece of software that is loosely coupled with other microservices to implement a larger service. For example, a microservice might store audio generated during a cloud-hosted meeting or other recording. The audio-storage microservice may in turn have a dependency on a cloud file storage microservice. As self-contained services, a microservice may execute in its own execution context, distinct from the execution context of monolithic application 104 or any other microservice 106. This allows microservices to execute on different computing devices, facilitating scale-out, load balancing, resiliency, among other benefits.

As illustrated, monolithic application 104 has a microservice dependency 112A on microservice 106A, which in turn has microservice dependencies 112B on microservice 106B and 112C on microservice 106C. Microservice 106A also has an external dependency 112D on external service dependency 110. As referred to herein, an external dependency is a dependency on a service that is deployed independent of service 102. Microservice 106B has microservice dependency 112E on microservice 106C. Microservice 106C has an inbound dependency 114 from dependent external service 108. As referred to herein, an inbound dependency refers to a dependency in which an external component depends on the component of service 102. FIG. 1 illustrates is just one example configuration of service 102—any number of monolithic applications, microservices, microservice dependencies, inbound dependencies, external dependencies, and the like are similarly contemplated. Also, as disclosed herein, monolithic applications and microservices are illustrative examples of applications that may be configured and/or deployed by the disclosed embodiments. Any other type of software component or application architecture is also similarly contemplated. Additionally, while the accompanying figures illustrate software applications and components deployed to a cloud-hosted environment, and type of hosting environment is similarly contemplated.

While configuring service 102 for deployment to a target environment, a hierarchy of deployment data models are analyzed to identify microservices 106. Any external dependencies of service 102 are identified in the same way. For each microservice/external service identified as a dependency of service 102, endpoints—e.g. IP addresses and URLs— may be identified, along with other configuration information. If configuration information about a particular dependency is not available—e.g. if the configuration information is particular to a specific region or a specific deployment—a user requesting to configure service 102 for deployment is asked to provide the missing information. As referred to herein, a target environment refers to a particular server, server farm, or data center where computer hardware will execute the deployment of service 102.

Figure 2:
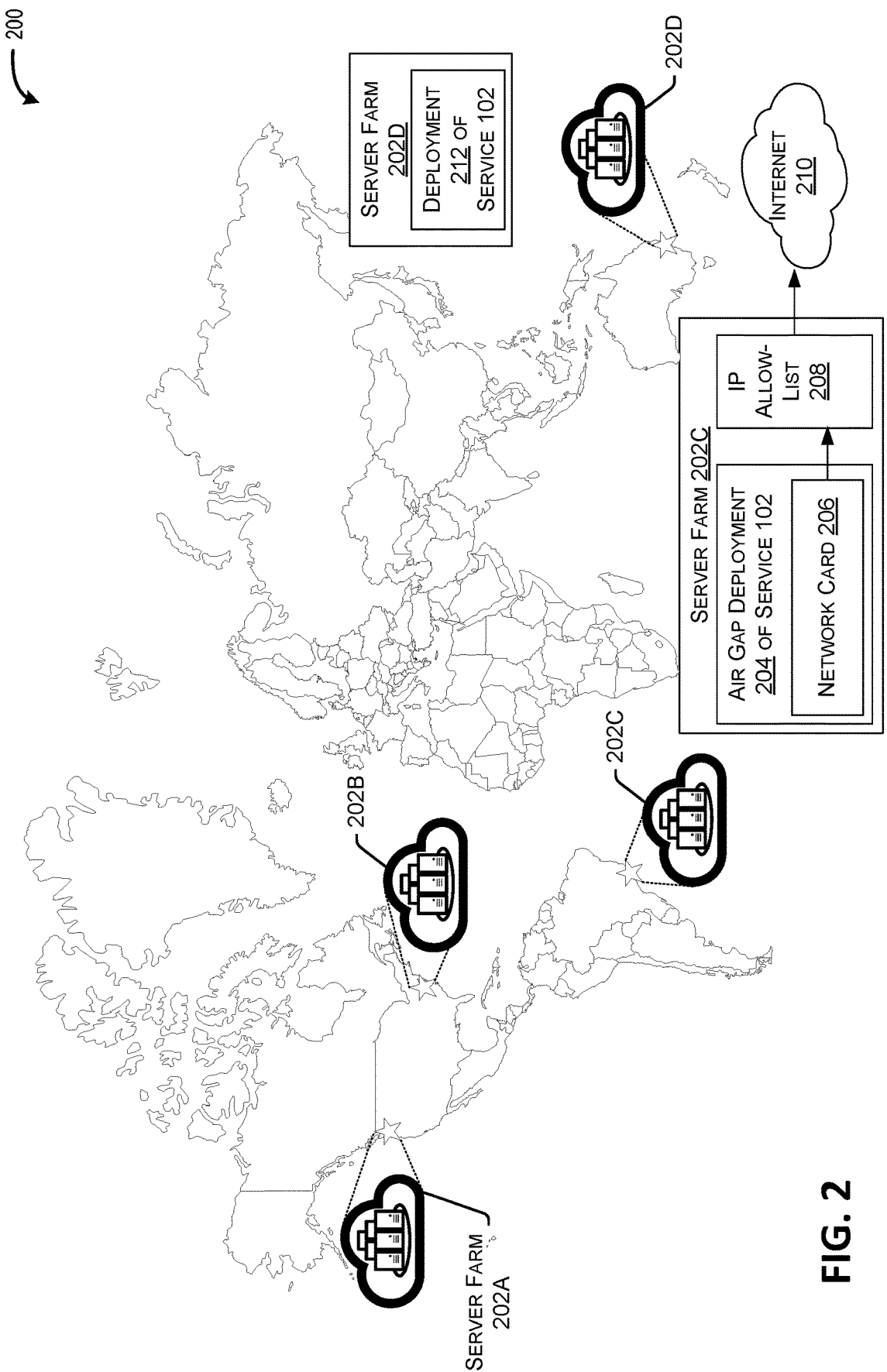
FIG. 2 is an illustration of deployments of a service to server farms in different regions of the world.

FIG. 2 is an illustration 200 of deployments of service 102 to server farms 202 in different regions of the world. Server farm 202A, located in Seattle, WA, and server farm 202B, located in Alexandria, VA, may both be located within a "North America" region. Server farm 202D is located in Sydney, Australia, which may be part of a "pacific islands" region. As illustrated, deployment 212 of service 102 has taken place in server farm 202D in Sydney Australia.

Server farm 202C, located in Rio de Janeiro, is illustrated as containing air gap deployment 204 of service 102. As referred to herein, an "air gap" deployment is an example of a high security deployment. An "air gap" deployment derives its name from the idea that no part of the deployment is even in physical contact with the outside world. In some embodiments, "Air gap" deployments may apply special rules to achieve this effect, such as limiting incoming and outgoing network connections to specific IP addresses. As illustrated, air gap deployment 204 includes network card 206 which is only able to communicate with internet 210 via connections to an IP address found in IP allow-list 208.

Figure 3:
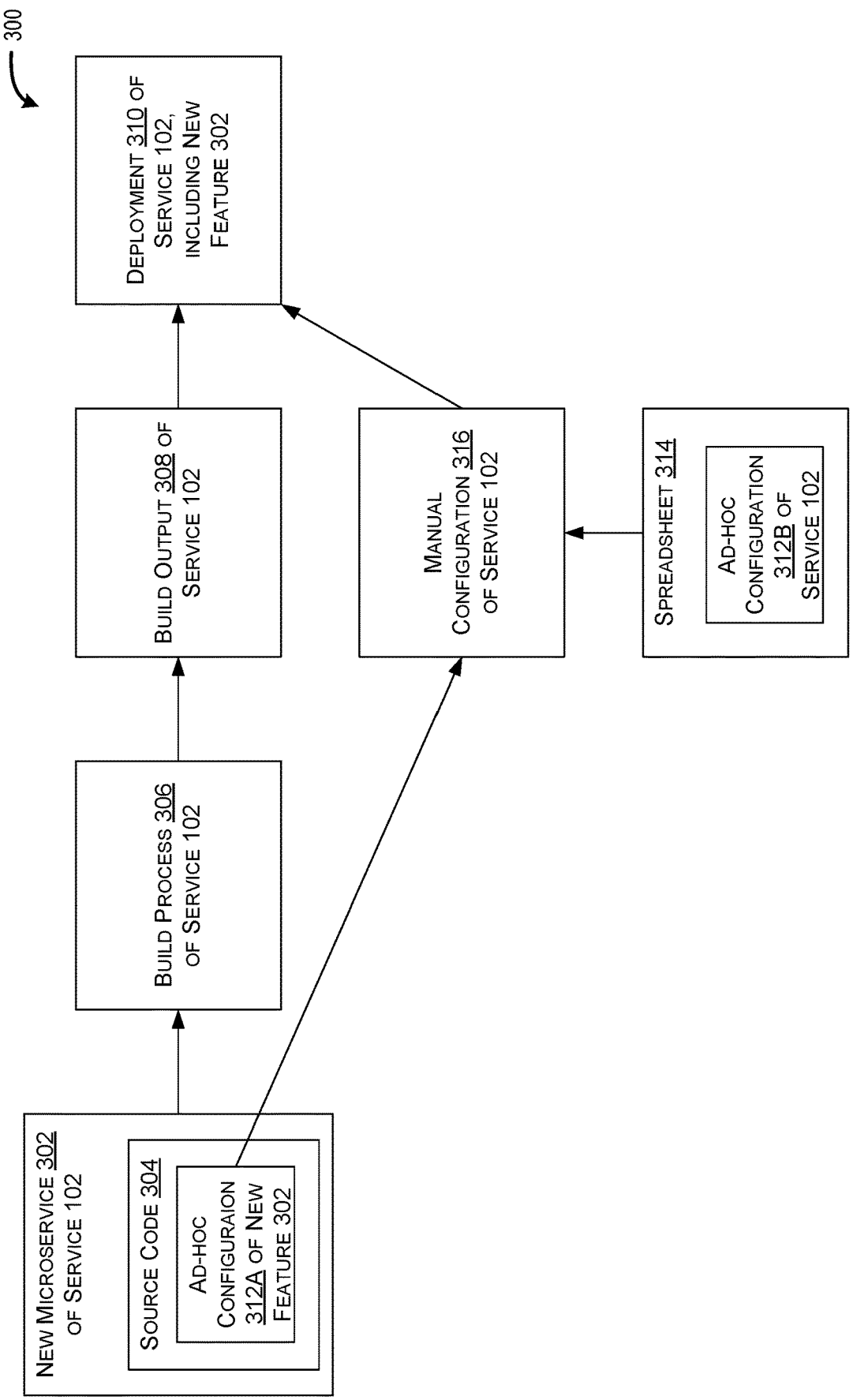
FIG. 3 is a block diagram illustrating ad-hoc configuration of a service.

FIG. 3 is a block diagram 300 illustrating manual configuration 316 of service 102. FIG. 3 illustrates two locations, source code 304 and spreadsheet 314, in which ad-hoc configuration information 312 of service 102 may be stored. In one scenario, a new microservice 302 is added to service 102. For example, new microservice 302 may be generated by source code 304. As illustrated, source code 304 may be provided to build process 306, which generates build output 308 of service 102.

Before pushing build output 308 to deployment 310 of service 102, a build engineer will configure service 102 for the particular target environment. When relying on ad-hoc configuration, the build engineer would have to know to consult ad-hoc configuration 312A in source code 304 and ad-hoc configuration 312B stored in spreadsheet 314. A failure to consider this information, or to mis-apply it, could result in a failed deployment, data loss, sporadic and difficult to trace failures, among other problems. Even if the deployment engineer did gather and properly interpret all of the ad-hoc configuration information, such information may quickly become outdated, leading to similar problems.

FIG. 4A is a block diagram 400 illustrating a dependency model repository 402 and a hierarchy of dependency models 415. Dependency model repository 402 may be implemented by a server computing device. The server computing device may be part of data farm 202, although any centralized location is similarly contemplated. Dependency model repository 402 includes global dependency models 406, regional dependency models 408, local dependency models 410, and additional dependency models 404. These groupings of dependency models are for illustrative purposes, and any number and type of dependency models are similarly contemplated. Also, while FIG. 4A depicts dependency models that are grouped by geographic region, any other type of grouping is similarly contemplated, such as by language, time zone, or the like. The contents of a dependency model are discussed below in conjunction with FIGS. 4C and 4D.

Dependency model repository 402 also includes application program interface (API) 412. While described in more detail below in conjunction with FIG. 4B, API 412 enables dependency models to be created, edited, and destroyed. For example, API 412 enables the component dependencies listed within a dependency model to be created, edited, and deleted, as well as the configuration properties of each listed component to be created, edited, or deleted. API 412 may also enable a user, as part of a process of configuring a deployment for a target environment, to request a list of properties that are not already associated with a value by a dependency model of the target environment. The user may specifically provide an identifier of a dependency model, or the user may provide attributes of the target environment from which dependency model repository 402 may select a dependency model.

Dependency model repository 402 may also include graphical user interface (GUI) 414, which receives user requests to generate a list of properties for a particular deployment. GUI 414 may allow the user to specify an identifier of a particular dependency model on which to base the configuration. GUI 414 may alternatively allow a user to specify attributes of a target environment, from which dependency model repository 402 may identify a particular dependency model. For example, the user may indicate that the deployment is to a data farm in Norway, and that the security level is normal. From this information, dependency model repository 402 may select a dependency model that targets Norway and which employs the requested level of security. Instead of responding to requests with text files containing the names of properties without values, GUI 414 provides the resulting list in a user interface such as a list box, a tree, or other UI construct. GUI 414 may then enable the user to provide the values of the configuration properties that are not already associated with values for the particular target environment. Whether dependency model repository 402 is accessed via API 412 or GUI 414, the same underlying functionality is provided.

Often, when a user searches for an existing dependency model based on a list of attributes, an exact match is not found. When this happens, dependency model repository 402 may identify a dependency model that matches at least some of the supplied attributes, and suggest that it be used as the basis for a new dependency model. The new dependency model may inherit from the identified dependency model, or the new dependency model may be a copy of the identified dependency model. In either case, re-using an existing dependency model provides a quick and safe way to create new dependency models.

Dependency model hierarchy 415 illustrates how dependency models can inherit from each other, incorporating the dependencies and configuration properties of any of their ancestor dependency models. As illustrated, global dependency model 416 is the root dependency model, and will contain components (e.g. microservices, external service, inbound services, etc.) used by every deployment of service 102. Regional dependency models 418A and 418B are examples of intermediate dependency models that apply component dependencies and configuration properties to some, but not all, of local dependency models 420. Local dependency models 420A, 420B, 420C, and 420D, also referred to as 'leaf' or 'leaf-most' nodes of dependency model hierarchy 415, contain listings of components and their configuration properties most specific to a particular deployment. While FIG. 4A illustrates dependency hierarchy as having 3 levels, any number of levels is similarly contemplated.

FIG. 4B is a block diagram illustrating an application program interface (API) 412 used to manage the dependency model repository. In some embodiments, API 412 includes retrieve deployment properties function 422, which takes as parameters an identifier (e.g. a name) of a dependency model and returns a list of properties 428 that are not already associated with values by the identified dependency model. Retrieve deployment properties function 422 may optionally take as a parameter the identifiers (e.g. names) of parent dependency models. The provided parent dependency models may override any default ancestor dependency models, allowing a dependency model to be quickly adapted to a different region.

API 412 also includes the create dependency property function 430, which takes as arguments a dependency model identifier 424, a property name 432, and optionally data types and runtime types 434. Dependency model identifier 424 identifies the dependency model in which the property is to be created, while property name 432 sets the name of the new property. Data types and runtime types 434 are one or more types that may be applied to values associated with the property to ensure the integrity and operation of the system. As discussed above, a data type may be applied to a value of the property at any time, and so it is often applied every time a value for the property is received. For example, a "admin email address" property may be associated with a regular expression data type that ensures the associated value is a proper email address. A user supplying a value for this property via GUI 414 may have the data type applied as the value is entered. A runtime type also ensures the correctness of a value associated with the property being created, but a runtime type is evaluated when the deployment is occurring or any other time when a dependent service is expected to be running. For example, a runtime type may establish that a configuration property pointing to a service endpoint does in fact point to an available and accessible service.

API 412 also includes the set dependency property value function 436, which takes as arguments a dependency model identifier 424, a property name 432, and a property value 438. The set dependency property value 436 function may be invoked when a user has supplied values for configuration properties that were not already associated with a value for the selected dependency model. In some embodiments, the set dependency property value 436 function adds the value received from the user to a configuration being generated for a target environment. In another embodiment, the value is incorporated into the dependency model selected for the target environment.

API 412 also includes the create dependency model function 440, which takes as arguments a dependency model identifier 424 and, optionally, one or more identifiers of parent dependency models 426. The create dependency model function 440 creates a blank model by default. Any supplied identifiers of parent dependency models 426 are used to establish dependency model hierarchy 415. In other embodiments, the create dependency model function 440 may take a parameter that identifies an existing dependency model to use as a template. The template dependency model may be used to initialize the newly created dependency model.

API 412 also includes the delete dependency model function 444, which takes as an argument a dependency model identifier 424. The delete dependency model function 444 deletes the identified dependency model and removes any inheritance references to the deleted dependency model.

API 412 also includes the receive deployment property values function 448, which takes as arguments a dependency model identifier 424 and a set of one or more user-provided property values 449 associated with the list of properties 428 that was returned by the retrieve deployment properties function 422. In response to this function, API 412 may generate a deployment configuration based on the dependency model identified by dependency model identifier 424. Additionally, or alternatively, API 412 may save some or all of the supplied values to the dependency model identified by the dependency model identifier 424, or any ancestors thereof. If the values are saved in this way, subsequent deployments will not require setting these values explicitly. In some embodiments, property values parameter 449 may allow the caller to indicate which values, if any, should be saved in the dependency model.

FIG. 4C illustrates an exemplary global dependency model 416. Global dependency model 416 is illustrated as a JSON file. This is for illustration purposes only, and any other file format is similarly contemplated. Similarly, any type of storage mechanism is similarly contemplated as a repository for global dependency model 416. In addition to storage as files, global dependency model 416 may be stored in a relational database, "NoSQL" database, or any other storage technique.

Global dependency model 416 lists two components, "root" 450" and "AudioServ" 479. "Root" property 450 defines dependencies and configuration properties of service 102. "AudioServ" 479 defines a microservice consumed by service 102. "ComponentType" property 451 indicates that "root" 450 is a "CoreService", i.e. "root" 450 refers to the service 102 itself, not a microservice or other dependency. Property 452 is one of a number of name-value properties that contains information about global dependency model 416. In the case of property 452, the "Name" 453 is "Service Name", a human—readable string that a deployment engineer may use to understand what value is being requested. The "Name" 453 is given the "Value" 455 of "Deployment Example"—a human readable string that is provided for information purposes. Property 452 also has a "DataType" 454 of "string", which may be applied when value 455 is set to ensure the value is a sequence of alphanumeric characters.

Property 456 is another name-value property. "Name" 457 is "DNS Suffix", a human-readable string describing property 456. "Value" 460 is set to " ", the empty string, as an indication that this value is not established for any deployment, and so a user will have to supply this value before a configuration can be generated. "DataType" 458 is "Regex"—short for "regular expression", a technique for ensuring that value 460 adheres to the format provided in "Pattern" 459. Any other pattern matching technique is similarly contemplated. As illustrated, the pattern ensures that value 460 is a Domain Name System (DNS) entry that ends in ".com".

Properties 452 and 456 define attributes of root 450 itself. "External Dependency" 461, "MicroserviceDependency" 466, "OnboardingDependency" 470, and "InboundDependency" 474 are examples of dependencies—services or other components used by service 102. When traversing the components listed in global dependency mode 416 to generate a configuration for a deployment to a target environment, dependency model repository 402 adds these dependencies to the list of dependent services. When the service 102 is being deployed according to the generated configuration, a deployment engine ensures that the listed dependencies are themselves deployed and active.

"External Dependency" 461 is an example of a dependency in which the service depended on is external to service 102. As such, an external dependency does not have its own entry as a component in a dependency model. As illustrated, external dependency 461 is a name-value property with the "Name" 462 of "SQL Azure", a human-readable description of the external service that is depended on. "Value" 465 includes an IP address which will be used by all services configured with a dependency model that inherits from global dependency model 416. "DataType" 463 of "IP" is one of a set of known data types that can be applied to verify a value of a property. In this case, "IP" indicates that "Value" 465 contains an IP address. Other data types include strings, numbers, floating point numbers, regular expressions, email addresses, domain names, IP address ranges, dates, times, and any other common data type. External dependency 461 also includes "RuntimeType" 464 of "Endpoint", one of a set of known runtime types that can be evaluated by connecting to an external computer to determine if the external dependency is actually available. "RuntimeType" 464 may be invoked when the deployment is performed, or any time when the external dependency 461 is expected to be available and accessible. Other runtime types include "GraphAPI", which lists deployed services and "Subscription" which confirms that a subscription to a dependency has been initialized and continues to be valid.

"MicroserviceDependency" 466 illustrates a dependency on another component that is listed in global dependency model 416. As illustrated, "Name" 467 of "Audio Service" is a human-readable description of the microservice that is depended on. "Value" 469 is "AudioServ", the identifier 479 of the corresponding microservice. In some embodiments, when traversing the dependencies defined in global dependency model 416 to generate a configuration, dependency model repository 402 will add to the "AudioServ" microservice to the list of components that must be accessible for deployment to be successful.

"OnboardingDependency" 470 indicates a dependency on a process that is performed manually, such as engaging in a registration process with an external dependency. As illustrated, "Name" 471 of "Directory Service" is a human-readable description of the onboarding dependency. "Prompt" 473 "Initiate onboarding procedure 124" is an example of a human-readable text that will be provided to a deployment engineer. In some configurations, onboarding dependency properties include a runtime type check to determine if the prescribed process has been taken. For example, a property may include a URL to a web service that indicates if a registration procedure has been performed on the directory service as prompted.

"InboundDependency" 474 illustrates a dependency in which an external service depends on service 102. As illustrated, "Name" 475 "Graph API" is a human-readable description of the external service that depends on the service being configured by global dependency model 416. "Value" 478 of "graph365.azure.com" is an example of a URL endpoint of the inbound dependency. This is indicated by the "Datatype" 476 of "URL"—one of the set of data types that may be checked at any time for correctness of the property value. "RuntimeType" 477 of "GraphAPI" indicates that "graph365.azure.com" is not just an arbitrary URL, but an endpoint of a graph API that maintains a list of active deployments. A graph API is used for illustrative purposes, and any other type of service that consumes service 102 is similarly contemplated.

FIG. 4D illustrates exemplary regional and local dependency models. Regional dependency model 418A illustrates an intermediate dependency model which applies to some but not all of the local dependency models 420. Regional dependency mode 418A may be associated with deployments that occur within a particular geographic region, such as "North America", although any other type of grouping of deployments is similarly contemplated. Local dependency mode 420A illustrates a leaf node in the dependency model hierarchy 415.

Regional dependency model 418A illustrates "root" 481. "Root" 481 correlates with "root" 450 of global dependency model 416, extending and potentially overwriting any configuration properties or dependences defined therein. As illustrated, "ExternalDependency" 482 illustrates another external dependency taken on by all deployments configured by a dependency model that inherits from regional dependency model 418A. "ExternalDependency" 482 is a name-value property with "Name" 483 of "DNSService" and "Value" 485 of "DNS.northamerica.azure.com". As such, a default DNS service for any deployments configured by dependency models that inherit from regional dependency model 418A will be "DNS.northamerica.azure.com." This value 485 takes precedence over any "ExternalDependency" with the name "DNS Service" defined in the "Root" component of global dependency model 416, and will be superseded by any "ExternalDependency" with the name "DNS Service" defined in the "Root" component of any child dependency model.

Local Dependency Model 420A illustrates another step down the dependency model hierarchy 415. Local dependency model 420A also includes a "Root" 486, which corresponds to the "Root" 481 of regional dependency model 418A and the "Root" 450 of global dependency model 416. When dependency model repository 402 generates a configuration for local dependency model 420A, it aggregates any configuration properties and any dependencies found in any components that appear in multiple dependency models.

As illustrated, the "SecurityLevel" 486 of "AirGap" is a property that overrides any default "Root"→"SecurityLevel" properties set by regional dependency model 418A or global dependency model 416. As discussed above, "AirGap" security ensures that only a limited set of IP addresses can be used to communicate with the deployment configured by local dependency model 420A.

"Property" 488 is another example of a name-value property that defines a property, "Admin Email", but which does not provide a value. Properties not associated with values will be aggregated by the retrieve deployment properties function 422 of dependency model repository 402 and presented to a requesting user. In this way, properties of a particular deployment can be customized by a deployment engineer or an automated deployment application.

"AirGapProperty" 489 is an illustration of a property of a dependency model that is particular to deployments with a heightened security level. The "Name" 490 of "Allowed IP Addresses" is a human-readable description of the property. "DataType" 491 indicates that allowed IP addresses are an "IPRange"—one or more contiguous ranges of IP addresses. However, instead of storing a value, "AirGapProperty" contains a "Prompt" 492, instructing the user where to retrieve the allowed range of IP addresses from. Air gap deployments, and other high security deployments, may by policy not allow information such as allowed IP ranges to be stored in a centralized location such as dependency model repository 402. Instead, the knowledge of how to configure the deployment defined by local dependency model 420A is encoded as instructions to the user. Additionally, or alternatively, a user may provide values for properties of an air gap component, with the understanding that those values will never be stored in the dependency model repository 402, but instead will be use transitorily to generate a configuration for the deployment.

Property 493, with a name of "Telemetry Sink", a DataType of "string", and a "Value" of "redmondtelemetry.com" is an illustration of a property that is not a dependency, but a setting that affects the execution of the deployed service. In this example, property 493 indicates where telemetry data should be routed for processing.

"StorageServ" 494 is an illustration of a microservice component. "StorageServ" was referred to by the "AudioServ" component 479 of global dependency model 416. As such, when generating a configuration, deployment model repository 402 will determine that the "Root" component (a combination of "Roots" 450, 481, and 486) has a microservice dependency on the AudioServ 479 component, which has a microservice dependency on the "StorageServ" 494 component. When the configuration is employed to deploy service 102, "AudioServe" 479 and "StoageServ" 494 will both be deployed if they are not already, and then be connected to each another. StorageServ" 494 has an "ExternalDependency" 495 on a "Storage Service", which has not yet been configured.

Figure 5:
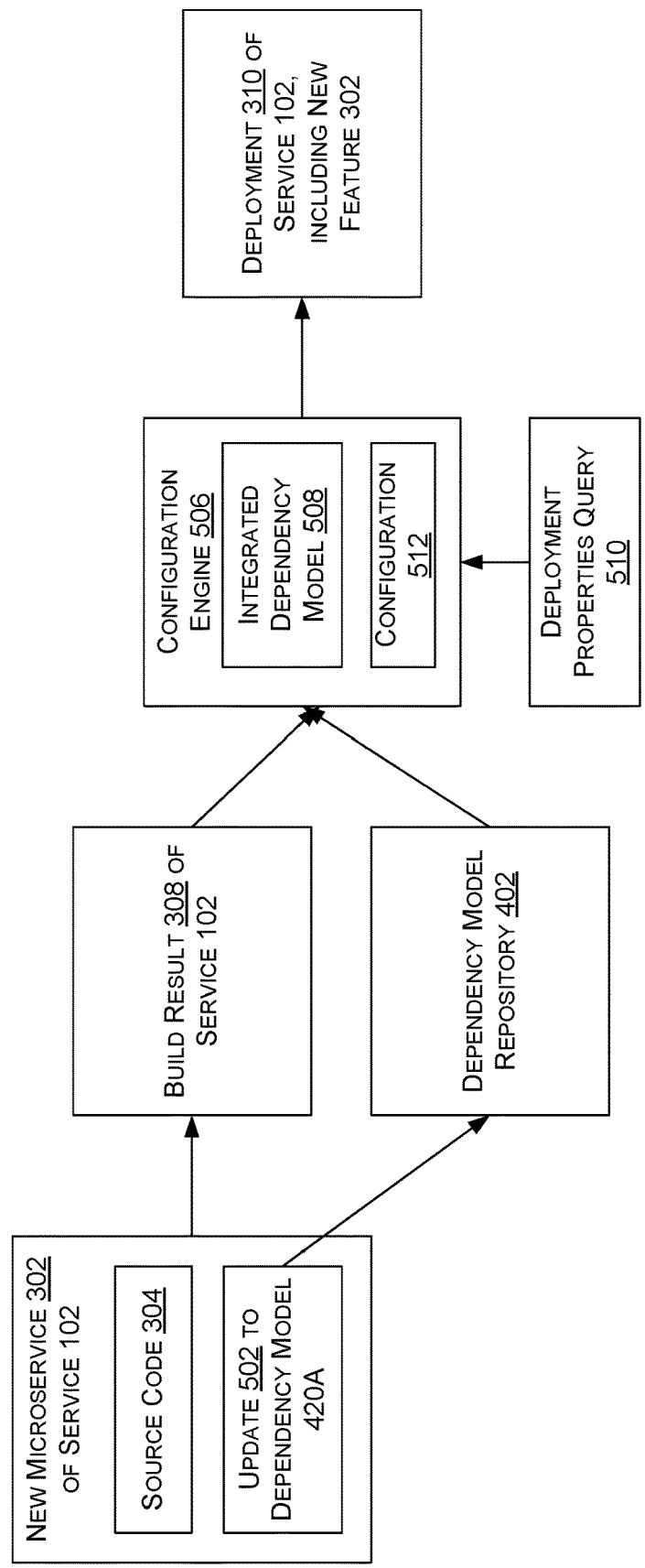
FIG. 5 is a block diagram illustrating updating the configuration of a service to include a new microservice.

FIG. 5 is a block diagram 500 that illustrates updating the configuration of service 102 with a new microservice 302. In contrast with the ad-hoc process depicted in FIG. 3, ad-hoc configuration information is no longer embedded in source code 304, but is instead encoded in an update 502 to dependency model 420A.

For example, update 502 may add a component "ImageConvert" to local dependency model 420A. "ImageConvert" may be listed along with "Root", "AudioServ", and "StorageServ" as components service 102. As another example, update 502 may add a dependency to an existing component, such as adding a "URLValidator" external dependency to "Root" 486. Update 502 may also change a configuration property of an existing dependency, such as changing the "DataType" of property 493 from "string" to "URL". Update 502 may be encoded declaratively, in the form of a JSON file similar to 416, 418A, and 420A, or update 502 may be encoded as a series of function calls on API 412.

As illustrated, update 502 is provided to dependency model repository 402, where it is incorporated into one or more existing dependency models, or optionally used to create a new dependency model. Dependency model repository 402 then generates integrated dependency model 508. Integrated dependency model 508 integrates a leaf dependency model, e.g. a local dependency model 420, and any ancestor dependency models. Configuration engine 506 may then receive a deployment properties query 510—e.g. a request to invoke retrieve deployment properties function 422. Configuration engine 506 may then solicit values for properties that are not defined for the integrated dependency model 508, using the solicited values and the integrated dependency model 508 to generate configuration 512. Deployment 310 of service 102 may then be based on configuration 512.

FIG. 6 illustrates an example of properties without values retrieved from a dependency model. Retrieved deployment properties 602 is an example of a return value generated by retrieve development properties function 422. Retrieved deployment properties 602 are illustrated in the same format as the dependency models 416, 418, and 420, although any other format is similarly contemplated. Also, as indicated above, GUI 414 may be used to display the properties listed in retrieved deployment properties 602, as well as receive user-supplied valued.

"Root" component 651 corresponds to the "Root" 450, 481, and 486 representative of the core service being deployed. The "Root" component has properties 652, 656, 670, 687, and 689. Property 652 illustrates a basic property that needs to be configured with a value for each deployment. The "Name" 653 of "Service Name" is a human-readable description of the "Value" 655 that is to be supplied. Similarly, "DNS Suffix" 656 and "Admin Email" are a human-readable descriptions of other values associated with properties 656 and 687. As illustrated, Data Type and RuntimeType information is omitted from retrieved deployment properties 602, although they could alternatively be included to inform a deployment engineer of the ranges of allowed values.

"OnboardingDependency" 670 illustrates a named property that provides instructions on how to onboard "Directory Service". While no value is expected to be entered, the result of this process may be checked to ensure it has been performed by a deployment engine when the configured deployment is performed.

AirGapProperty 689 illustrates a property used to configure an "air gap" or other high security deployment. As illustrated, the "Value" 692 includes instructions on where to retrieve the allowed IP addresses from, and optionally where to apply them. As illustrated, the deployment engineer may overwrite the instructions with the allowed IP addresses, knowing that the values will not be stored in dependency model repository 402.

"StorageServ" 694 illustrates a separate component that has configuration properties. "ExternalDependency" 695 includes a "Name" of "Storage Service", indicating to the deployment engineer what value should be entered.

Retrieved deployment properties 602 may be generated as part of a process of creating a configuration 512. Dependency model repository 402 may integrate a dependency model 420 associated with a target environment with any ancestor dependency models indicated in deployment model hierarchy 415. The components of each of the dependency models and their ancestors are integrated, along with their configuration properties and dependencies, to generate an integrated dependency model 508. This integrated dependency model is then traversed to identify configuration properties without values, onboarding dependencies, "air gap" properties, and any other configuration properties that need to be associated with a value, or that prompt the deployment engineer to perform a necessary step in the deployment process.

FIG. 7 is an illustration of corresponding values submitted to the dependency model repository. Property 752 has been given the value "SharePoint" 755, property 756 has been given the value "contoso.sharepoint.com" 760, property 788 has been given the value 796 of "admin@contoso.com", and "AirGapProperty" 789 has been given the value 792 of "256.43.23.54-256.43.23.64." Similarly, "ExternalDependency" 795 of the "StorageServ" component 794 with the name "Storage Service" has been given the value "storage-.contoso.azure.com." These values will be incorporated to a deployment configuration, and optionally applied to the underlying dependency model.

Figure 8:
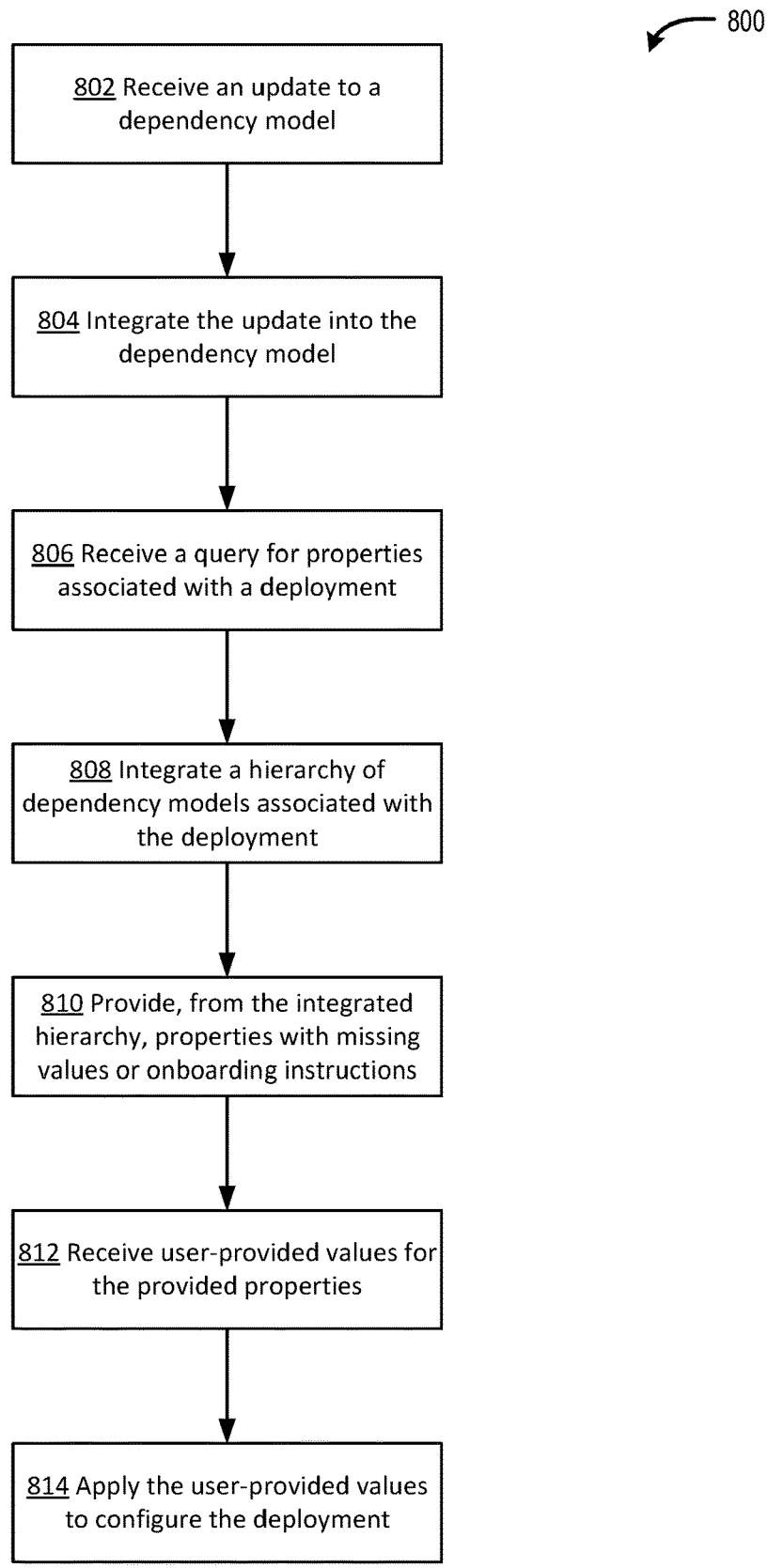
FIG. 8 is a flow diagram illustrating an example operational procedure according to the described implementations.

FIG. 8 is a flow diagram illustrating an example operational procedure 800 according to the described implementations. Procedure 800 begins with operation 802, where an update 502 to a dependency model 420A is received. In some embodiments, the update 502 to the dependency model 420A is associated with the creation of a new microservice 106 or other component, the introduction of a new dependency 110 to an existing component, the creation or modification of a property 452 of a component, or the like.

Procedure 800 continues at operation 804, where the update 502 to the dependency model 420A is integrated into the dependency model 420A. For example, the addition of a new microservice 106 to the cloud-hosted service 102 may be associated with an update 502 that adds dependencies of the new microservice 106, as well as updating an existing microservices that now depend on the new microservice 106. For example, update 502 may indicate that new microservice 106C is an inbound dependency of dependent external service 108.

Procedure 800 continues at operation 806, where a query for deployment properties 510 is received. The query 510 may be received from a user deploying service 102, or from automation software that automatically deploys service 102. Query 510 may include an identifier of a dependency model 424, and optionally, identifiers of any parent dependency models 426.

Procedure 800 continues at operation 808, where a hierarchy of dependency models 415 is integrated. For example, dependency models 416, 418A, and 420A depicted in FIG. 4A may be combined as described herein into integrated dependency model 508. Integrating dependency models found in hierarchy 415 generates an effective dependency model that includes configuration properties and dependencies from each dependency model in the hierarchy 415. In some embodiments, the properties and values are integrated into a leaf-most dependency model, e.g. 420A.

In some embodiments, when properties or dependencies appear multiple times in hierarchy 415, the value of the property found in the leaf-most dependency model is chosen. In other configurations, if the leaf-most dependency model includes a property but not the corresponding value, the hierarchy 415 is traversed towards the root node 416 until a dependency model with a value for the property is found. However, in other configurations, e.g. when the leaf-most dependency model is associated with an "air gap" or other high security configuration, if a leaf-most dependency node to have a property does not also include a value associated with that property, any values of that property found in ancestor nodes are ignored.

Procedure 800 continues at operation 810, where properties without values 602 are provided to a user or automated deployment script. In some embodiments, the properties without values 602 are provided in response to the query 510 received at operation 806.

Procedure 800 continues at operation 812, where user-provided values 702 for the properties without values 602 are received.

Procedure 800 continues at operation 814, where the user-provided values are applied to configure the deployment. In some embodiments, the user-provided values may be used to update one or more dependency models of hierarchy 415.

It should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some embodiments, the system components include a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Figure 9:
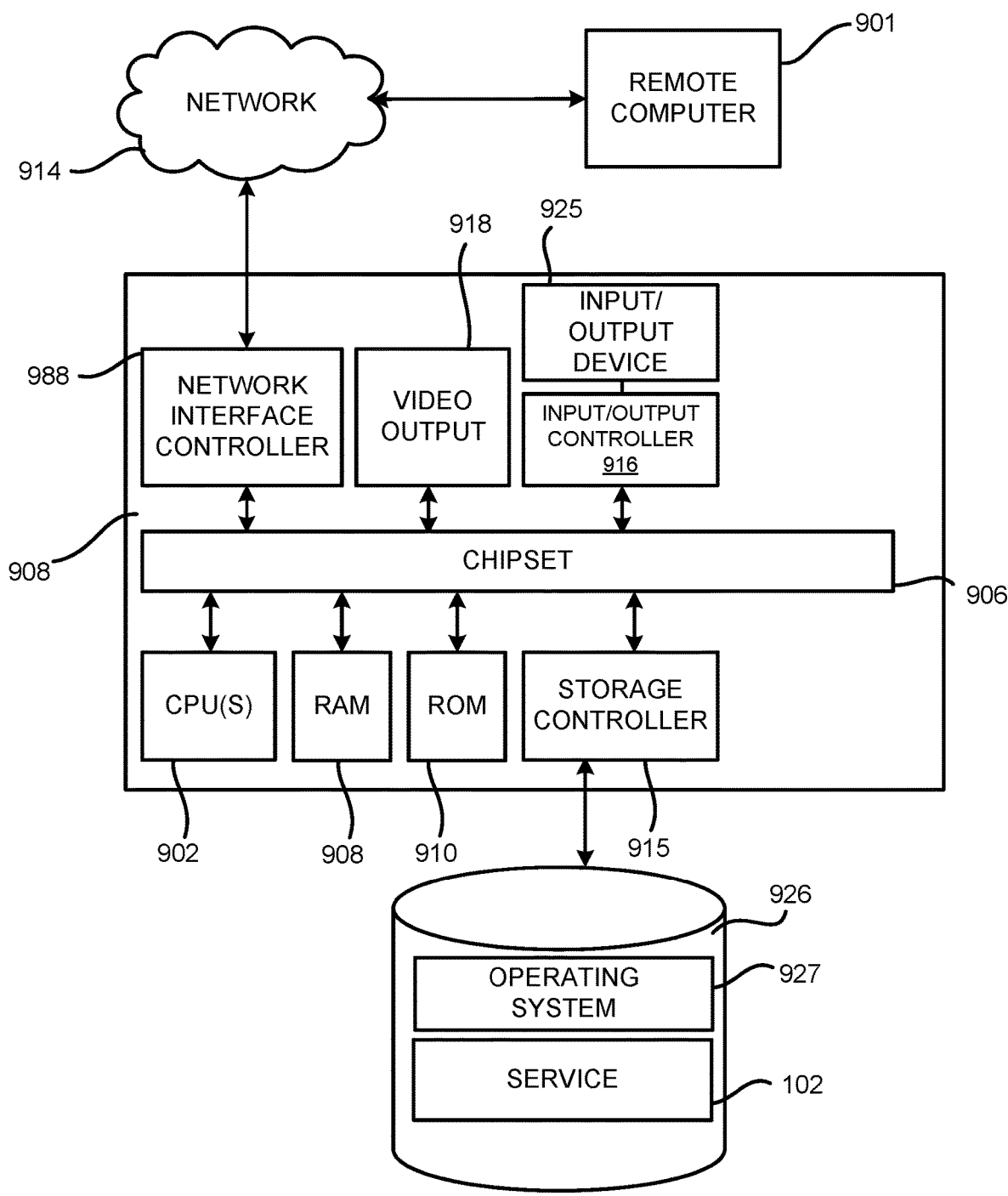
FIG. 9 is a computer architecture diagram illustrating a computing device architecture for a computing device capable of implementing aspects of the techniques and technologies presented herein.

Although FIG. 9 refers to the components of FIGS. 1-8, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

FIG. 9 is a computer architecture diagram illustrating a computing device architecture for a computing device capable of implementing aspects of the techniques and technologies presented herein. The computer architecture shown in FIG. 9 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 9 may be utilized to execute any of the software components described above.

The computer architecture includes a baseboard 902, or "motherboard," which is a printed circuit board to which a multitude of components or devices may be connected by way of a system bus or other electrical communication paths. In one illustrative embodiment, one or more central processing units (CPUs) 904 operate in conjunction with a chipset 906. The CPUs 904 may be standard programmable processors that perform arithmetic and logical operations necessary for the operation of the computer architecture.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer architecture. The chipset 906 may further provide an interface to a computer-readable storage medium such as a read-only memory (ROM) 910 or non-volatile RAM (NVRAM) for storing basic routines that help to startup the computing device and to transfer information between the various components and devices. The ROM 910 or NVRAM may also store other software components necessary for the operation of the computer architecture in accordance with the embodiments described herein.

The computer architecture may operate in a networked environment using logical connections to remote computing devices and computer systems through a network 914, such as the local area network. The chipset 906 may include functionality for providing network connectivity through a network interface controller (NIC) 988, such as a gigabit Ethernet adapter. The NIC 988 is capable of connecting the computer architecture to other computing devices over the network 914. It should be appreciated that multiple NICs 988 may be present in the computer architecture, connecting the computer to other types of networks and remote computer systems. The network allows the computer architecture to communicate with remote services and servers, such as the remote computer 901. As can be appreciated, the remote computer 901 may be any computing device, such as a server computing device that is part of one of server farms 202.

The computer architecture may be connected to a mass storage device 926 that provides non-volatile storage for the computing device. The mass storage device 926 may store system programs, application programs, other program modules, and data, which have been described in greater detail herein. The mass storage device 926 may be connected to the computer architecture through a storage controller 915 connected to the chipset 906. The mass storage device 926 may consist of one or more physical storage units. The storage controller 915 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 926, other storage media and the storage controller 915 may include MultiMediaCard (MMC) components, eMMC components, Secure Digital (SD) components, PCI Express components, or the like.

The computer architecture may store data on the mass storage device 926 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 926 is characterized as primary or secondary storage, and the like.

For example, the computer architecture may store information to the mass storage device 926 by issuing instructions through the storage controller 915 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 926 by detecting the physical states or characteristics of one or more particular locations within the physical storage units.

In addition to the mass storage device 926 described above, the computer architecture may have access to other computer-readable media to store and retrieve information, such as program modules, data structures, or other data. As the operating system 927, the service 102, and other modules are depicted as data and software stored in the mass storage device 926, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 926 may store an operating system 927 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, or iOS operating systems, available from their respective manufacturers. It should be appreciated that other operating systems may also be utilized. The mass storage device 926 may store other system or application programs and data utilized by the computer architecture, such as any of the other software components and data described above. The mass storage device 926 might also store other programs and data not specifically identified herein.

In one embodiment, the mass storage device 926 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 904 transition between states, as described above. According to one embodiment, the computer architecture has access to computer-readable storage media storing computer-executable instructions which, when executed by the computer architecture, perform the various routines described above with regard to FIG. 9, and the other FIGS. The computing device might also include computer-readable storage media for performing any of the other computer-implemented operations described herein.

The computer architecture may also include one or more input/output controllers 916 for receiving and processing input from a number of input devices, such as a keyboard, a mouse, a microphone, a headset, a touchpad, a touch screen, an electronic stylus, image processing and gesture recognition devices, or any other type of input device. The input/output controller 916 is in communication with an input/output device 925. The input/output controller 916 may provide output to a display, such as a computer monitor, a flat-panel display, a digital projector, a printer, a plotter, or other type of output device. The input/output controller 916 may provide input communication with other devices such as a microphone, a speaker, game controllers and/or audio devices.

For example, the input/output controller 916 can be an encoder and the input/output device 925 can include a full speaker system having a plurality of speakers. The encoder can use a spatialization technology, and the encoder can process audio output audio or output signals received from the application 929. The encoder can utilize a selected spatialization technology to generate a spatially encoded stream that appropriately renders to the input/output device 925.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The disclosure presented herein may be considered in view of the following clauses.

Clause 1: A computer-implemented method for configuring a deployment of a service, the computer-implemented method comprising: receiving a request for properties associated with the deployment of the service, the request including an identifier of a dependency model associated with the deployment of the service, wherein the dependency model includes identifiers of a plurality of components of the service and an indication of a dependency relationship between a pair of the plurality of components; traversing the dependency relationship to identify a property in the dependency model without a value; providing the identified property in response to the request; receiving a value of the identified property; and configuring the deployment of the service based on the received value of the identified property.

Clause 2: The computer-implemented method of clause 1, further comprising: automatically deploying the service based on the configuration.

Clause 3: The computer-implemented method of clause 1, wherein a dependent component of the pair of the plurality of components comprises a microservice deployed with the service or an external dependency deployed independent of the service.

Clause 4: The computer-implemented method of clause 1, wherein the dependency relationship comprises a first dependency relationship, and wherein the dependency model includes a second dependency relationship between an individual component of the service and an external component, the computer-implemented method further comprising: traversing the second dependency relationship to identify a property associated with the external component; and providing onboarding instructions retrieved from the property associated with the external component in response to the request.

Clause 5: The computer-implemented method of clause 1, wherein the value comprises a first value, wherein the dependency model comprises an inbound dependency relationship that defines an external component having a dependency on an individual component of the plurality of components, the computer-implemented method further comprising: traversing the inbound dependency relationship to identify a property associated with the external component, wherein the property is not associated with a value; providing the property associated with the external component in response to the request; receiving a second value of the property associated with the external component; and further configuring the deployment of the service based on the second value.

Clause 6: The computer-implemented method of clause 1, wherein the property is associated with a runtime type, the computer-implemented method further comprising: when the service is deployed, verifying the received value by performing a runtime check to determine if the received value refers to an active service.

Clause 7: The computer-implemented method of clause 1, wherein the dependency model inherits properties and dependencies from a parent dependency model.

Clause 8: The computer-implemented method of clause 1, wherein the received value is saved in association with the identified property in the dependency model.

Clause 9: A computer-readable storage medium having computer-executable instructions stored thereupon which, when executed by a processor, cause the processor to: receive a request for properties associated with a deployment of a service, the request including an identifier of a dependency model associated with the deployment of the service, wherein the dependency model is part of a hierarchy of dependency models; incorporating, from the hierarchy of dependency models, ancestor models of the dependency model into the dependency model; wherein the dependency model includes identifiers of a plurality of components of the service and an indication of a dependency relationship between a pair of the plurality of components; traversing the dependency relationship to identify a property in the dependency model without a value; providing the identified property in response to the request; receiving a value of the identified property; and configuring the deployment of the service based on the received value of the identified property.

Clause 10: The computer-readable storage medium of clause 9, wherein an ancestor dependency model is incorporated into the dependency model by including any properties or dependencies of the ancestor model into the dependency model.

Clause 11: The computer-readable storage medium of clause 9, wherein the hierarchy of dependency models comprises global, regional, and local levels;

Clause 12: The computer-readable storage medium of clause 9, further comprising: traversing the dependency relationship to identify a plurality of properties without values; providing the plurality of properties without values in response to the request; and receiving a plurality of values corresponding to the plurality of properties.

Clause 13: The computer-readable storage medium of clause 12, wherein the plurality of properties are provided in a text file, and wherein the plurality of values are received as part of the text file.

Clause 14: The computer-readable storage medium of clause 9, wherein the property is associated with a data type, further comprising: when the value is received, verify the received value conforms to the data type.

Clause 15: A computing device, comprising: one or more processors; and at least one computer storage media having computer-executable instructions stored thereupon which, when executed by the one or more processors, will cause the computing device to: receive a request for properties associated with a deployment of a service, the request including an identifier of a dependency model associated with the deployment of the service, wherein the dependency model is part of a hierarchy of dependency models; incorporating, from the hierarchy of dependency models, properties and dependencies from ancestor models of the dependency model into the dependency model; wherein an individual property with a value in one of the ancestor models is treated as if it does not have a value when the individual property exists in the dependency model without a value; and wherein the dependency model includes identifiers of a plurality of components of the service and an indication of a dependency relationship between a pair of the plurality of components; traversing the dependency relationship to identify a property in the dependency model without a value; providing the identified property in response to the request; receiving a value of the identified property; and configuring the deployment of the service based on the received value of the identified property.

Clause 16: The computing device of clause 15, wherein the identified property comprises a list of allowed IP addresses, and wherein the deployment of the service is not allowed to access an IP address not part of the list of allowed IP addresses.

Clause 17: The computing device of clause 15, wherein the instructions further cause the computing device to: receive an update to the service comprising an additional feature; receive an update to the dependency model associated with the additional feature, including additional properties or dependencies associated with the additional feature; and incorporating the update to the dependency model into the dependency model.

Clause 18: The computing device of clause 15, wherein the identified property is provided with instructions on how to retrieve the associated value.

Clause 19: The computing device of clause 15, wherein the existence of the dependency relationship causes a deployment component to verify, at the time of deployment, that a component that is depended on is operational and available for use by the service.

Clause 20: The computing device of clause 15, wherein a dependent component of the pair of the plurality of components comprises an external dependency deployed independent of the service, wherein the identified property represents an endpoint of the external dependency.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for configuring a deployment of a service, the computer-implemented method comprising:
   receiving a request for properties associated with the deployment of the service, wherein:
      the request includes an identifier for a regional dependency model associated with the deployment of the service to a first geographic region of a plurality of geographic regions, the regional dependency model being in a level of a hierarchy below a global dependency model useable for deploying the service to the plurality of geographic regions; and
      the regional dependency model includes a plurality of identifiers for a plurality of components of the service and an indication of a dependency relationship between a pair of components of the plurality of components;
   traversing the dependency relationship to identify a property in the regional dependency model without a value, wherein the property is required for the first geographic region and is not required for a second geographic region of the plurality of geographic regions;
   causing the property in the regional dependency model without the value to be displayed in response to receiving the request;
   receiving a user-defined value for the property in the regional dependency model without the value thereby producing a modified property with the user-defined value; and
   configuring the deployment of the service for the first geographic region and not for the second geographic region based on the modified property with the user-defined value.

2. The computer-implemented method of claim 1, further comprising automatically deploying the service to the first geographic region and not to the second geographic region based on the configuration.

3. The computer-implemented method of claim 1, wherein a dependent component of the pair of components comprises a microservice deployed with the service or an external dependency deployed independent of the service.

4. The computer-implemented method of claim 1, wherein the dependency relationship comprises a first dependency relationship, and wherein the regional dependency model includes a second dependency relationship between an individual component of the service and an external component, the computer-implemented method further comprising:
   traversing the second dependency relationship to identify another property associated with the external component; and
   providing onboarding instructions retrieved from the other property associated with the external component in response to receiving the request.

5. The computer-implemented method of claim 1, wherein the user-defined value comprises a first value, wherein the regional dependency model comprises an inbound dependency relationship that defines an external component having a dependency on an individual component of the plurality of components, the computer-implemented method further comprising:
- traversing the inbound dependency relationship to identify another property associated with the external component, wherein the other property is not associated with the user-defined value;
- providing the other property associated with the external component in response to receiving the request;
- receiving a second user-defined value of the other property associated with the external component; and
- further configuring the deployment of the service for the first geographic region and not for the second geographic region based on the second user-defined value.

6. The computer-implemented method of claim 1, wherein the property is associated with a runtime type, the computer-implemented method further comprising:
- when the service is deployed, verifying the user-defined value by performing a runtime check to determine if the user-defined value refers to an active service.

7. The computer-implemented method of claim 1, wherein the regional dependency model inherits properties and dependencies from the global dependency model.

8. The computer-implemented method of claim 1, further comprising incorporating an ancestor dependency model into the regional dependency model by including any properties or dependencies of the ancestor dependency model into the regional dependency model.

9. The computer-implemented method of claim 1, wherein the hierarchy comprises global, regional, and local levels.

10. The computer-implemented method of claim 1, wherein the property is associated with a data type and the user-defined value is verified to conform to the data type.

11. The computer-implemented method of claim 1, wherein the property is provided with instructions on how to retrieve the user-defined value.

12. A system comprising:
- one or more processors; and
- at least one computer storage media having computer-executable instructions stored thereupon which, when executed by the one or more processors, cause the system to perform operations comprising:
  - receiving a request for properties associated with the deployment of the service, wherein:
    - the request includes an identifier for a regional dependency model associated with the deployment of the service to a first geographic region of a plurality of geographic regions, the regional dependency model being in a level of a hierarchy below a global dependency model useable for deploying the service to the plurality of geographic regions; and
    - the regional dependency model includes a plurality of identifiers for a plurality of components of the service and an indication of a dependency relationship between a pair of components of the plurality of components;
  - traversing the dependency relationship to identify a property in the regional dependency model without a value, wherein the property is required for the first geographic region and is not required for a second geographic region of the plurality of geographic regions;
  - causing the property in the regional dependency model without the value to be displayed in response to receiving the request;
  - receiving a user-defined value for the property in the regional dependency model without the value thereby producing a modified property with the user-defined value; and
  - configuring the deployment of the service for the first geographic region and not for the second geographic region based on the modified property with the user-defined value.

13. The system of claim 12, wherein the operations further comprise automatically deploying the service to the first geographic region and not to the second geographic region based on the configuration.

14. The system of claim 12, wherein the regional dependency model inherits properties and dependencies from the global dependency model.

15. The system of claim 12, wherein the operations further comprise incorporating an ancestor dependency model into the regional dependency model by including any properties or dependencies of the ancestor dependency model into the regional dependency model.

16. The system of claim 12, wherein the hierarchy comprises global, regional, and local levels.

17. The system of claim 12, wherein the property is associated with a data type and the user-defined value is verified to conform to the data type.

18. The system of claim 12, wherein the property is provided with instructions on how to retrieve the user-defined value.

19. A computer-readable storage medium having computer-executable instructions stored thereupon which, when executed by a processor, cause the processor to perform operations comprising:
- receiving a request for properties associated with the deployment of the service, wherein:
  - the request includes an identifier for a regional dependency model associated with the deployment of the service to a first geographic region of a plurality of geographic regions, the regional dependency model being in a level of a hierarchy below a global dependency model useable for deploying the service to the plurality of geographic regions; and
  - the regional dependency model includes a plurality of identifiers for a plurality of components of the service and an indication of a dependency relationship between a pair of components of the plurality of components;
- traversing the dependency relationship to identify a property in the regional dependency model without a value, wherein the property is required for the first geographic region and is not required for a second geographic region of the plurality of geographic regions;
- causing the property in the regional dependency model without the value to be displayed in response to receiving the request;
- receiving a user-defined value for the property in the regional dependency model without the value thereby producing a modified property with the user-defined value; and configuring the deployment of the service for the first geographic region and not for the second geographic region based on the modified property with the user-defined value.

20. The computer-readable storage medium of claim 19, wherein the operations further comprise automatically deploying the service to the first geographic region and not to the second geographic region based on the configuration.

* * * * *